Figure 1:
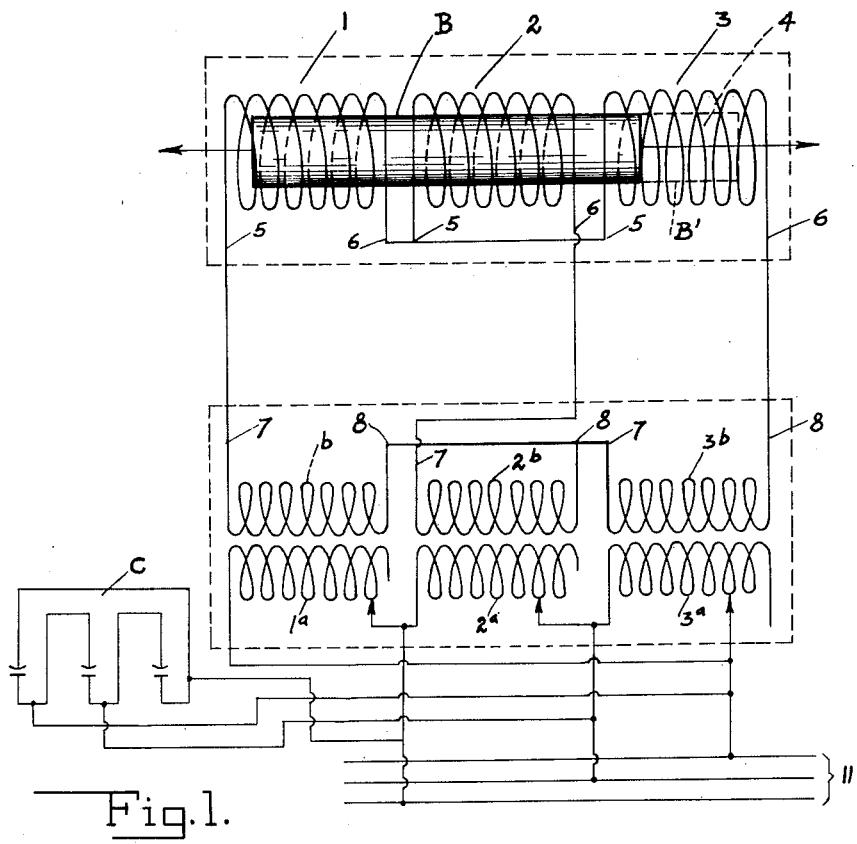

Oct. 29, 1957  J. M. GUTHRIE  2,811,623
METHOD OF HEATING METAL BILLETS BY LOW
FREQUENCY ELECTRICAL POWER
Filed March 29, 1956

INVENTOR.
JAMES M. GUTHRIE.
BY
Christy, Parmelee & Strickland
ATTORNEYS.

2,811,623

METHOD OF HEATING METAL BILLETS BY LOW FREQUENCY ELECTRICAL POWER

James M. Guthrie, Pittsburgh, Pa., assignor to Loftus Engineering Corporation, a corporation of Maryland Application March 29, 1956, Serial No. 574,907

2 Claims. (Cl. 219—10.41)

My invention relates to the heating of metal billets preparatory to extrusion, rolling, forging, or other shaping operation, and consists in certain new and useful improvements in a method of heating such billets by electric induction.

In recent years the heating of metal billets for forming operations has been accomplished electrically, that is, in electric induction furnaces. There are many advantages to be realized by heating billets in electric induction furnaces rather than fuel-fired furnaces. Specifically, the heating may be done more rapidly and under more accurate control as to temperature, and as a result there is less oxidation or scaling of the surfaces of the billets. Apparatus for heating billets by high frequency induction is relatively elaborate and expensive, whereas apparatus for the induction heating of billets by means of current at power-line or low frequency is relatively inexpensive.

It has been recognized that metal billets of many commercial sizes may be perfectly heated when placed within a single-phase cylindrical coil that is energized by current at commercial frequencies, say a frequency of 60 cycles per second, but the objection to the use of a single-phase coil of this sort is that the electric power costs are relatively high, and the load factors in the usual 3-phase power supplies are unbalanced, wherefore power companies in many cases refuse to allow such single-phase equipment to be connected to their supply lines.

There is no objection by the power companies when substantially balanced 3-phase loadings are imposed upon their lines. In view of this circumstance, it has hitherto been proposed to provide a helical coil which comprises a series of three coils arranged on common axis, with one coil in mechanical abutment upon the next. The three component coils are severally connected to the three phases of the 3-phase power supply lines. In the heating of billets, particularly non-ferrous billets, within a compound coil of this sort, it has been found that the flux density in the two regions where the coils abut one another is of less effective concentration than at other points throughout the extent of the coil, with the consequence and effect that the billet heated by induction within the coil reveals lower temperatures in such regions of lower flux density than elsewhere. Manifestly, such lack of uniformity in the temperature of a heated billet is objectionable. In fact, non-ferrous metal billets heated in such a coil cannot be readily worked uniformly. For example, the observation of the ram of an extruding machine operating on such a billet will show during the extruding movement two instances where the movement of the ram is retarded as those two points of lower temperature in the body of the billet reach the mouth of the extruding die of the machine.

Many attempts have been made to overcome this objection. It has been proposed, for instance, that supplemental coil windings be provided around the regions of the three-phase coil where the flux density is relatively low. These supplemental coil windings were intended to increase the flux density in such regions, whereby the ultimate flux density throughout the length of a compound coil would result in the uniform heating of the billet throughout its length. Theoretically this proposal seems sound, but it does not work satisfactorily in service.

Attempts have been made to develop transformer equipment which would provide from a 3-phase power supply suitable energy for a single-phase coil, but so far as I am aware no suitable transformer equipment has yet been designed, certainly not within such a cost range as would render the equipment practical. Of course, special motor generator equipment may be used, but the cost is prohibitive.

My invention consists in the conception of how to heat a billet uniformly, particularly a non-ferrous billet, within the confines of a three phase coil, whereby the coil may be energized by a 3-phase commercial power supply, or by simple transformer equipment connected to normal 3-phase power supply lines, while keeping the 3-phases substantially in load balance. There will be no objectionable unbalancing of the 3-phase lines, and practically uniform heating of a billet is obtained throughout its length.

Figure 2:
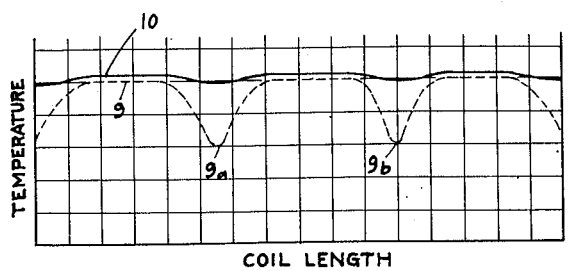

The attached drawing, forming a part of this specification, shows diagrammatically in Fig. 1 a three-phase coil with a billet positioned within it, and illustrates schematically transformer equipment connected to three-phase power supply lines for energizing such coil; and Fig. 2 is a heat distribution chart, showing the heat curve for a 3-phase coil as heretofore operated and the heat curve as obtained in the practice of my invention.

Referring to Fig. 1 of the drawings, an induction heating coil is diagrammatically indicated. It is formed of three coil sections 1, 2 and 3. As those skilled in the art will know, the coil sections are wound of heavy copper tubing, through which cooling water may be circulated, or of heavy copper bar having a tubing brazed thereto for the conduction of cooling water. The turns of each coil section and the coil sections themselves are electrically insulated from one another, and the three sections are arranged in succession, end to end, in axial alignment, and in rigid mechanical assembly. In mechanical effect the coil sections form a single tubular structure, within which a chamber 4 is formed for the heating of metal billets. Electrically, the assembled structure comprises three individual coils, each having electrical terminals 5 and 6, whereby connection of each coil section may be made to a source of low-frequency electrical current of specified intensity and a field of magnetic flux established in each coil section. Each field of magnetic flux is of less density adjacent to the ends of the coil section in which it is established than it is in the regions between the ends of the coil section.

When a metal billet B is placed in the heating chamber 4 and low-frequency current is caused to flow through the coil sections, the magnetic flux in the several coil sections induces differences in electrical potential between various points in the body of the billet, whereby currents are caused to flow between such points and heat is generated in the billet body. Due to the lower concentration of flux density in the regions at the ends of the coil sections, the electrical potential developed and the current flowing in the body of the billet are correspondingly reduced at the regions of the billet body adjacent to the ends of the coil sections, with the consequence that the temperature of the billet body after a specified heating time is not uniform, but varies substantially as indicated by the curve 9 in Fig. 2, where the dip 9a in the curve indicates the temperature in the body portion of the billet adjacent to the plane in which coil section 1 abuts coil section 2, and dip 9b indicates the temperature in the billet body portion adjacent to the plane in which coil section 2 abuts coil section 3.

In accordance with the objects of my invention, I obtain a more uniform heating of the billet in an individually energized, multi-section coil, substantially as represented by the temperature curve 10 in Fig. 2, and this I accomplish by averaging the effect of the various flux densities generated in the heating chamber 4 of the integrated, multi-section coil.

This averaging of the effect of the various flux densities is obtained by slowly moving the billet B longitudinally of the chamber 4. The speed of movement of a billet of given size and length will be so determined that the effect of the flux density, to which each portion of the billet is exposed per unit of time, will be averaged or substantially equalized. The speed of movement for a given billet can readily be determined by those skilled in the art. As one example, let it be assumed that five minutes is required to heat to desired temperature the body of a billet exposed throughout to a flux of the density existing at the center of one of the identical and identically energized coil sections 1, 2, 3. Accordingly, the billet will be moved through the multi-section coil at such speed that each portion of the body of the billet will be exposed for a total of substantially five minutes to one and/or another of the regions (there being three such regions in this case) of maximum flux density. The billets to be heated in the multi-section coil 1, 2, 3 should have a length substantially exceeding the length of a single section of the coil, or exceeding the average length of the three coil sections in this case. Furthermore, the length of the billet should be substantially less than the overall electrical length of the three coil sections, the overall length being the total of the electrical length of each of the coil sections. When billets of such length characteristics with respect to the multi-section and sectionally energized coil are moved progressively through the coil at proper speed, substantial uniformity of heating is obtained, it being understood that the electrical length of a coil section may be equal to or less than the mechanical length of the section; that is to say, the electrical length of a coil section is equal to the distance between the points (Fig. 1) where the electrical taps 5 and 6 are united to the coil section and between which points electrical current flows through the turns of the coil section.

Rather than continuously advancing a plurality of billets slowly in close sequence through the chamber 4, each billet may be slowly moved back and forth in the chamber, as indicated by the two arrows and the dotted lines B' in Fig. 1. Such back and forth motion is performed at a speed and within such range as to expose substantially all portions of the billet body to one or more of the regions of maximum flux concentration for a total of the required minutes of heating time.

By virtue of my improved method it becomes feasible to energize the three-section coil, 1, 2, 3, by means of a commercial or industrial 3-phase power supply, without objectionably unbalancing the phases.

Again referring to Fig. 1 of the drawings, the primary coils 1a, 2a and 3a of three transformer elements are connected severally to the three phases of power supply lines 11, and it will be understood that the effective turns of each primary coil may be adjusted in conventional way. The terminals 7 and 8 of the secondary coils 1b, 2b and 3b of the transformer equipment are Y-connected, as shown, to the terminals 5 and 6 of the three coil sections 1, 2 and 3 of the billet-heating unit. In the usual case the Y-connection of the induction coil sections to the transformer secondaries is preferred to a delta connection, although there may be instances where a delta connection is suitable.

In order to correct for the low power factor caused by the inductive reactance of the multi-section induction coil, suitable capacitors C may be connected, as shown, across the input leads of the transformer primaries.

The mechanism for feeding billets through the multi-section coil, or for reciprocating one or more billets in the coil, may be readily furnished by the engineer. Various forms of mechanisms can readily be provided for the purpose. Indeed, in some cases the movement of the billets may be done manually, by means of push-rods. And it is contemplated that certain modifications of the invention may be practiced without departing from the spirit of the invention defined in the appended claims.

I claim:

1. The method of heating a metal billet by electrical induction in a coil comprised of a plurality of coil sections arranged in succession and in substantial abutment to form a heating chamber, passing low-frequency electrical current through the turns of each coil section and creating within said chamber a field of magnetic flux for each coil section of less density adjacent to the ends of the coil section than between such ends, placing in said chamber a metal billet of substantially less length than the total electrical length of the assembled coil sections and under the effects of said fields of magnetic flux inducing differences of potential between various points in the body of the billet and thereby effecting the flow of electrical currents and the consequent generation of heat in the body of the billet, while continuously moving the billet slowly through an interval in said heating chamber substantially equal to the difference between the length of said billet and the total electrical length of said coil sections for averaging the inductive effect of the regions of low flux density with the inductive effect of the intervening regions of high flux density, whereby the body of the billet becomes heated to substantially uniform temperature throughout.

2. The method of heating a metal billet by electrical induction in a coil comprised of a plurality of coil sections arranged in succession and in substantial abutment to form a heating chamber, passing low-frequency electrical current through the turns of each coil section and creating within said chamber a field of magnetic flux for each coil section of less density adjacent to the ends of the coil section than between such ends, placing in said chamber a metal billet of substantially less length than the total electrical length of the assembled coil sections and under the effects of said fields of magnetic flux inducing differences of potential between various points in the body of the billet and thereby effecting the flow of electrical currents and the consequent generation of heat in the body of the billet, while slowly reciprocating the billet longitudinally in said chamber through an interval which is less than the electrical length of one of said coil sections.

References Cited in the file of this patent
UNITED STATES PATENTS 2,720,576    Lackner               Oct. 11, 1955
2,722,589    Marquardt            Nov. 1, 1955